United States Patent
Janssens et al.

(10) Patent No.: US 9,914,114 B2
(45) Date of Patent: *Mar. 13, 2018

(54) METHOD FOR PRODUCING METAL EXCHANGED METALLO-ALUMINOPHOSPHATES BY SOLID-STATE ION EXCHANGE AT LOW TEMPERATURES

(71) Applicant: Haldor Topsøe A/S, Kgs. Lyngby (DK)

(72) Inventors: Ton V. W. Janssens, Bagsværd (DK); Peter N. R. Vennestrøm, Copenhagen (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/127,881

(22) PCT Filed: Oct. 15, 2014

(86) PCT No.: PCT/EP2014/072143
§ 371 (c)(1),
(2) Date: Sep. 21, 2016

(87) PCT Pub. No.: WO2015/154827
PCT Pub. Date: Oct. 15, 2015

(65) Prior Publication Data
US 2017/0113212 A1    Apr. 27, 2017

(30) Foreign Application Priority Data

Apr. 7, 2014 (DK) .................... 2014 00198
Aug. 26, 2014 (DK) .................... 2014 00474

(51) Int. Cl.
| | | |
|---|---|---|
| *B01J 29/84* | (2006.01) | |
| *B01J 29/85* | (2006.01) | |
| *B01D 53/94* | (2006.01) | |
| *C01B 39/54* | (2006.01) | |
| *B01J 37/00* | (2006.01) | |
| *B01J 37/30* | (2006.01) | |
| *F01N 3/20* | (2006.01) | |
| *B01J 29/08* | (2006.01) | |

(52) U.S. Cl.
CPC .......... *B01J 29/85* (2013.01); *B01D 53/9418* (2013.01); *B01J 29/084* (2013.01); *B01J 37/0018* (2013.01); *B01J 37/30* (2013.01); *C01B 39/54* (2013.01); *F01N 3/208* (2013.01); *B01D 2255/20761* (2013.01); *B01D 2255/50* (2013.01); *B01J 2229/183* (2013.01); *B01J 2229/186* (2013.01); *B01J 2229/38* (2013.01); *F01N 2370/02* (2013.01); *F01N 2570/14* (2013.01); *F01N 2610/02* (2013.01); *F01N 2610/03* (2013.01); *F01N 2610/10* (2013.01)

(58) Field of Classification Search
CPC .. C01B 39/54; B01J 29/84; B01J 29/85; B01J 37/02378; B01J 2229/186; B01J 37/30; B01J 2229/38; B01D 53/9418
See application file for complete search history.

(56) References Cited

U.S. PATENT DOCUMENTS

| | | | |
|---|---|---|---|
| 9,018,120 B2 * | 4/2015 | Hurgobin | B01D 53/8628 502/60 |
| 2009/0196812 A1 | 8/2009 | Bull et al. | |
| 2010/0267548 A1 | 10/2010 | Andersen et al. | |
| 2013/0108544 A1 | 5/2013 | Qi et al. | |
| 2013/0251611 A1 | 9/2013 | Wen et al. | |

FOREIGN PATENT DOCUMENTS

| | | |
|---|---|---|
| EP | 0 955 080 A1 | 11/1999 |
| WO | WO 94/08925 A1 | 4/1994 |
| WO | WO 2008/118434 A1 | 10/2008 |

OTHER PUBLICATIONS

Vennestrom et al, "Influence of lattice stability on hydrothermal deactivation of Cu—ZSM—5 and Cu—IM—5 zeolites for selective catalytic reduction of NOx by NH3", Journal of Catalysis, 309(2014) 477-490.*
D. Wang et al., "NH$_3$-SCR Over Cu/SAPO-34-Zeolilte Acidity and Cu Structure Changes as a Function of Cu Loading." Catalysis Today, vol. 231, pp. 64-74, 2014.
G.L. Price, et al., "Solid-State Ion-Exchange of Zeolite." Catalyst Preparation Science and Engineering, pp. 283-295, 2007.

* cited by examiner

*Primary Examiner* — David M Brunsman
(74) *Attorney, Agent, or Firm* — Blank Rome LLP

(57) ABSTRACT

Method for the preparation of a metal exchanged crystalline microporous metalloaluminophosphate or mixtures containing metal exchanged microporous metalloaluminophosphates materials comprising the steps of providing a dry mixture containing a) one or more metalloaluminophosphates starting materials that exhibit ion exchange capacity, and b) one or more metal compounds; heating the mixture in a gaseous atmosphere containing ammonia to a temperature (less than 300 C) and for a time sufficient to initiate and perform a solid state ion exchange of ions of the metal compound and ions of the crystalline microporous material; and obtaining the metal-exchanged microporous metalloaluminophosphate material or mixtures containing the metal-exchanged microporous metalloaluminophosphate material.

17 Claims, No Drawings

METHOD FOR PRODUCING METAL EXCHANGED METALLO-ALUMINOPHOSPHATES BY SOLID-STATE ION EXCHANGE AT LOW TEMPERATURES

The present invention relates to a method for the preparation of metal exchanged crystalline microporous metalloaluminophosphates materials by exposing a physical mixture of a metal oxide or a metal salt, or a combination thereof, and a crystalline microporous metalloaluminophosphate material having an ion exchange capability to an atmosphere containing ammonia.

The ion exchange capability of metalloaluminophosphates originates from the fact that some of phosphorous or aluminum atoms in the crystalline microporous framework having a formal valence state of 5+ or 3+, respectively, are isomorphously substituted by atoms with a different formal charge. This creates a negative charge in the metalloaluminophosphate, which is counter balanced by a positive ion, e.g. $H^+$, $NH_4^+$, $Na^+$ or K. Copper and iron cations can also form suitable cations to counterbalance this negative charge, which is the reason that Cu and Fe exchanged metalloaluminophosphates can be produced by the method described above.

The term metalloaluminophosphate refers to an aluminophosphate material in which some of the phosphorous or aluminium in the crystalline framework, or combinations thereof, is isomorphously replaced by one or more atoms chosen from the group consisting of metals, silicon and germanium. Known examples of such materials are silico aluminophosphates (SAPO), titanium aluminophosphates, stannoaluminophosphates.

Metalloaluminophosphates materials exchanged with Fe or Cu are effective catalysts for the catalytic reduction of $NO_x$, e.g in the exhaust of power plants, or in the exhaust of diesel engines in both stationary and automotive applications. The best known example of such a material is SAPO-34 exchanged with Cu.

The catalytic reduction of $NO_x$ is referred to as SCR (selective catalytic reduction). The two best known varieties of the SCR process to reduce $NO_x$ are (1) hydrocarbon SCR (HC-SCR), in which hydrocarbons are used as a reductant, and (2) ammonia-SCR ($NH_3$-SCR) in which ammonia is used as a reductant. In the case of hydrocarbon-SCR, the source of the hydrocarbons is the diesel fuel, also used for the diesel-engine, or residual hydrocarbons in the exhaust gas due to incomplete combustion. The common technology for using $NH_3$-SCR is by injection of urea in the exhaust gas stream, which decomposes to produce the required $NH_3$ for the SCR reaction. Cu-SAPO-34 is a known catalyst for both types of SCR reaction.

A general method to produce metal exchanged crystalline microporous metalloaluminophosphates is by contacting a crystalline microporous metalloaluminophosphate with a solution of the desired metal ion followed by filtration, washing, drying and calcination. Consequently, following this general procedure, contacting a crystalline microporous metalloaluminophosphate with an appropriate solution containing Cu or Fe ions, such as Cu nitrate, Cu acetate, Fe nitrate, Cu or Fe sulfate, with a microporous metalloaluminophosphate in the $H^+$, $NH_4^+$ form, or ion-exchanged with a different cation, will usually produce a material that shows catalytic activity for the SCR reaction with hydrocarbons or $NH_3$. The choice of the anion of the metal salt is in principle arbitrary, but usually anions are chosen such that sufficient solubility is obtained, is easily removed during the production, is safe to handle, and does not interact with the zeolite in an unfavourable way.

The conventional method for introduction of metal ions in crystalline microporous metalloaluminophosphates is often not very effective. It is known that to obtain a sufficiently high activity in the selective catalytic reduction with a SAPO-34 material, activation at high temperatures (>750° C.) is needed. (P. N. R. Vennestrøm, A. Katerinopoulou, R. R. Tiruvalam, A. Kustov, P. G. Moses, P. Concepcion, A. Corma, ACS Catal. 2013, 3, 2158-2161). It has been shown that such a heating procedure causes a redistribution of the Cu throughout the SAPO-34 crystals, implying that initial aqueous exchange is not trivial.

An alternative procedure to introduce ions in crystalline microporous metalloaluminophosphate materials is by solid state ion exchange, which involves making a physical mixture of the crystalline microporous metalloaluminophosphate material and a source of the cations to be introduced into the microporous crystals, followed by some appropriate treatment that will drive the cations into the microporous materials. (G. L. Price, in: J. R. Regalbuto (Ed.), Catalyst Preparation: Science and Engineering, CRC Press, Boca Raton, London, New York, 2007, pp. 283-296.)

Patent Application U.S. 2013/0108544 discloses a method for the production of an ion exchanged microporous silicoaluminophosphate material by producing metal oxide or metal salt particles on the surface of SAPO-34 crystals, followed by heating at 500-800° C., preferably 650-750° C. to produce the metal cations, for a period of 12-72 hours. The metal oxide particles or metal salt particles are formed on the surface of the SAPO-34 crystals by impregnation or precipitation. This procedure is different from a conventional ion exchange, since the actual ion exchange step is performed after removing the liquid needed for impregnation or deposition. The procedure prescribes a high temperature and long heating times. The procedure can be executed in dry or wet air. A variation of this method is described in D. Wang, L. Zhang, J. Li, K. Kamasamudram, W. S. Epling, Catal. Today (2013), DOI 10.1016/j.cattod.2013.11.040 and M. Zamadics, X. Chen, L. Kevan, J. Phys. Chem. (1992) 5488. Instead of producing the metal oxide particles on the surface of the SAPO crystals, the SAPO-34 in the H form was physically mixed with CuO and heated to 800° C. for 12 h. The accomplishment of Cu ion exchange could be confirmed in both publications.

Patent EP955080 discloses a method for the introduction of Cu, Fe, Co, Mn, Pd, Rh, or Pt in zeolites with a Si/Al ratio larger than 5 by physically mixing (i) ammonium salts, $NH_3/NH_4^+$-zeolites, or N-containing compounds, and (ii) a zeolite with a Si/Al ratio larger than 5, and (iii) an active compound chosen from a compound of one or more of the aforementioned metals at room temperature and atmospheric pressure and heated to at least 300° C. until the ion exchange process is completed, followed by cooling to room temperature. During heating, the mixture is preferably exposed to an ammonia or amine-containing atmosphere, with a heating rate higher than 10 K per minute.

We have observed that preparation of metal exchanged microporous metalloaluminophosphate materials is much improved when carrying out solid state ion exchange with a physical mixture of an oxide and/or salt of a metal and a microporous silicoaluminophosphate is performed in an atmosphere containing $NH_3$. The presence of ammonia makes it possible to execute the solid state exchange at a temperature as low as 250° C. This is surprising in view of the fact that usually temperatures in the range 600-800° C.

are needed to activate a Cu-SAPO-34 material for the SCR reaction. Furthermore, the method of the invention also allows for using a temperature below 300° C., which is the lower temperature limit for solid state ion exchange disclosed in patent EP955080 for alumina-silicate zeolites, where it usually is much easier to introduce metal ions.

The advantage of the present invention is that SCR active crystalline microporous metalloaluminophosphate materials can be produced at significantly lower temperatures, thus reducing the risk of damaging the these materials during the introduction of the metal ions.

Pursuant to the above observation, this invention provides a solid state ion exchange method for the preparation of a metal exchanged crystalline microporous metalloaluminophosphate or mixtures containing metal exchanged microporous metalloaluminophosphates materials comprising the steps of providing a dry mixture containing
a) one or more metalloaluminophosphates starting materials that exhibit ion exchange capacity and
b) one or more metal compounds;

heating the mixture in a gaseous atmosphere containing ammonia to a temperature and for a time sufficient to initiate and perform a solid state ion exchange of ions of the metal compound and ions of the crystalline microporous material;

and obtaining the metal-exchanged microporous metalloaluminophosphate material or mixtures containing the metal-exchanged microporous metalloaluminophosphate material.

The one or more metalloaluminophosphate starting materials contain in an embodiment of the invention one or more metals chosen from the group silicon, titanium, tin, zinc, magnesium, manganese, cobalt or iron.

Useful microporous metalloaluminophosphate starting materials can be any microporous metalloaluminophosphate material with an ion exchange capability.

Preferably, a part of the phosphorous and possibly aluminium atoms in the microporous aluminophosphate material are replaced by Si, to produce a silicoaluminophosphate.

Preferably, the microporous metalloaluminophosphate starting materials have the crystal structure designated as CHA, AEI, AFI, AEL, AST, AFR, AFO and FAU. The best known examples of such a material are SAPO-34, SAPO-44, SAPO-18.

In an embodiment the microporous metalloaluminophosphate materials are in the H, or $NH_4$-form.

In another embodiment the microporous metalloaluminophosphate starting materials contain an organic structure directing agent.

In still an embodiment the metal compounds in the dry mixture for the preparation of the metal exchanged metal exchanged crystalline microporous metalloaluminophosphate(s) are metal oxides, metal nitrates, metal phosphates, metal sulfates, metal oxalates, metal acetates, or combinations thereof.

Useful metals in these metal compounds are include Fe, Cu, and Co, or combinations thereof.

In an embodiment these metals are chosen from Fe and/or Cu.

In an embodiment the metal compounds are CuO or $Cu_2O$ or a mixture thereof.

Another embodiment is the exposure of the said mixture to an atmosphere containing ammonia, wherein the content of ammonia in the atmosphere is between 1 and 5000 vol. ppm.

A further embodiment is the exposure of the said mixture to an atmosphere containing ammonia, wherein the oxygen content in the atmosphere is 10 vol % or lower.

Another embodiment is the exposure of the said mixture to an atmosphere containing ammonia, wherein the water content in the atmosphere is 5 vol % or lower.

In a preferred embodiment the mixture is heated in the atmosphere containing ammonia to a temperature below 300° C.

In still a preferred embodiment the mixture is heated in the gaseous atmosphere containing ammonia to a temperature between 100° C. and 250° C.

A further aspect of the invention is metal exchanged microporous metalloaluminophosphate material or mixtures of metal exchanged microporous metalloaluminophosphate materials obtained by a method according to anyone of the above disclosed aspects and embodiments of the invention.

Still an aspect of the invention is a method for the removal of nitrogen oxides from exhaust gas by selective catalytic reduction with a reductant, comprising contacting the exhaust gas with a catalyst comprising a metal exchanged crystalline microporous metalloalumino-phosphate material or mixtures of metal exchanged crystalline microporous metalloaluminophosphate materials obtained by a method according to anyone of the above described embodiments of invention.

Preferred reductants comprise ammonia or a precursor thereof or hydrocarbons.

EXAMPLE 1

A catalyst was prepared by mixing CuO and H-SAPO-34 material to a content of 12.5 wt % CuO. A sample of the catalyst was placed in a quartz-U tube reactor, and heated to 250° C. for 10 h in an atmosphere containing 500 ppm $NH_3$ in $N_2$. After heating, the catalyst was cooled down to 160° C. and exposed to a gas mixture of 500 ppm NO, 533 ppm $NH_3$, 5 vol % $H_2O$, 10 vol % $O_2$ in $N_2$. The temperature was then stepwise increased to 180, 200, and 220° C. and the conversion of NO was measured at a space velocity of 2700 NL/g cat h, as a record for the material's SCR activity.

The measured NO conversions at different temperatures are given in Table 1. It is noted that the SCR-active SAPO-34 material has not been heated further than 250° C. after addition of the Cu. This example illustrates that the method of the invention provides a way to produce an active catalyst based on SAPO-34 without the need of activation at elevated temperatures (>700° C.), which is the case for conventionally ion-exchanged SAPO-34 materials [P. N. R. Vennestrøm, A. Katerinopoulou, R. R. Tiruvalam, A. Kustov, P. G. Moses, P. Concepcion, A. Corma, ACS Catal. 2013, 3, 2158-2161.] after addition of Cu to the microporous material.

TABLE 1

NOx conversion at different temperatures following 10 h heating of a mixture of CuO and H-SAPO-34 at 250° C. in 500 ppm $NH_3$.

| Temperature (° C.) | NOx conversion (%) |
|---|---|
| 180 | 4.8 |
| 200 | 8.0 |
| 220 | 15.0 |

EXAMPLE 2

For comparison, a catalyst similar to the one mentioned in Example 1 was prepared by mixing CuO and H-SAPO-34 material to a content of 12.5 wt % CuO. A sample of the catalyst was placed in a quartz-U tube reactor, and heated to 250° C. for 10 h in a pure $N_2$ atmosphere. After heating, the catalyst was cooled down to 160° C. and exposed to a gas mixture of 500 ppm NO, 533 ppm $NH_3$, 5 vol % $H_2O$, 10 vol % $O_2$ in $N_2$. The temperature was then stepwise increased to 180, 200, and 220° C. and the conversion of NO was measured at a space velocity of 2700 NL/g cat h, as a record for the material's SCR activity.

The measured NO conversions at different temperatures are given in Table 2. The NOx conversions obtained after treatment of the mixture of CuO and H-SAPO-34 in pure $N_2$ are much lower than those obtained after a comparable treatment in the presence of 500 ppm $NH_3$, given in Example 1. This shows that the presence of $NH_3$ is essential to be able to produce Cu-SAPO-34 by solid state ion exchange at low temperatures. As the measurement of the SCR activity implies exposure of the system to a low concentration of ammonia, some formation of Cu-SAPO-34 occurs during the measurement, and a low conversion of NOx is measured, entirely in line with the present invention.

TABLE 2

NOx conversion at different temperatures following 10 h heating of a mixture of CuO and H-SAPO-34 at 250° C. in nitrogen only.

| Temperature (° C.) | NOx conversion (%) |
|---|---|
| 180 | 1.8 |
| 200 | 1.7 |
| 220 | 3.5 |

EXAMPLE 3

This example shows that an active metal exchanged metalloaluminophosphate catalyst for SCR can be prepared below 300° C. by the method of the invention using $Cu_2O$. A dry mixture of 10 wt. % $Cu_2O$ and a H-SAPO-34 zeolite was prepared by grinding in a mortar. A sample of this mixture was placed in a quartz U-tube reactor, and heated to a predetermined temperature between 100 and 250° C. in nitrogen. After reaching the desired temperature, 500 ppm $NH_3$ was added to the gas stream for 5 hours. After this treatment the catalytic activity of the resulting material was determined by cooling to 160° C. in nitrogen, and exposing the powder mixture to a gas atmosphere consisting of 500 ppm NO, 533 ppm $NH_3$, 5 vol % $H_2O$, 10 vol % $O_2$ in $N_2$, and the NOx conversion was measured at a space velocity of 2700 Nl/g cat h, as a record for the material's SCR activity. Then, the reaction temperature was increased to 180 and 200° C. and at each temperature the NOx conversion was determined under the same conditions.

The NOx conversion in the SCR reaction over the metal exchanged zeolite prepared at 100, 150, 200 and 250° C. respectively in 500 ppm NH3 is given in Table 3.

TABLE 3

NOx conversion over $Cu_2O$ + H-SAPO-34 mixtures after treatment in NH3 for 5 h at various temperatures

| Pretreatment temperature ° C. | NOx conv. @ 160° C. (%) | NOx conv. @ 180° C. (%) | NOx conv. @ 200° C. (%) |
|---|---|---|---|
| 100 | 0.9 | 1.0 | 2.2 |
| 150 | 0.9 | 1.1 | 2.9 |
| 200 | 2.3 | 3.8 | 7.9 |
| 250 | 7.4 | 14.2 | 26.0 |

The invention claimed is:

1. Method for the preparation of a metal exchanged crystalline microporous metalloaluminophosphate or mixtures containing metal exchanged microporous metalloaluminophosphates materials comprising the steps of
   providing a dry mixture containing
   a) one or more metalloaluminophosphates starting materials that exhibit ion exchange capacity and
   b) one or more metal compounds;
   heating the mixture in a gaseous atmosphere containing ammonia to a temperature between 100° C. and 250° C. and for a time sufficient to initiate and perform a solid state ion exchange of ions of the metal compound and ions of the crystalline microporous material;
   and obtaining the metal-exchanged microporous metalloaluminophosphate material or mixtures containing the metal-exchanged microporous metalloaluminophosphate material.

2. Method according to claim 1, wherein the one or more metalloaluminophosphate starting materials contain one or more metals chosen from the group silicon, titanium, tin, zinc, magnesium, manganese, cobalt or iron.

3. Method according to claim 1, where the one or more metalloaluminophosphate starting materials have the framework code of CHA, AEI, AFI, AEL, AST, AFR, AFO and FAU.

4. Method according to claim 1, wherein the one or more metalloaluminophosphate starting materials are selected from the group consisting of SAPO-34, SAPO-44, SAPO-18, or combinations thereof.

5. Method according to claim 1, wherein the one or more microporous metalloalumino-phosphate starting materials are in the $H^+$ or $NH_4^+$ form.

6. Method according to claim 1, wherein the one or more microporous metalloalumino-phosphates starting materials contain an organic structure directing agent.

7. Method according to claim 1, wherein the one or more metal compounds in the dry mixture are selected from the group of metal oxides, metal nitrates, metal phosphates, metal sulfates, metal oxalates, metal acetates or combinations thereof.

8. Method according to claim 1, wherein the metals in the one or more metal compounds are selected from the group of Fe, Co, Cu.

9. Method according to claim 1, wherein the one or more metal compounds consist of oxides of Fe and/or Cu.

10. Method according to claim 1, wherein the one or metal compounds are Cu(I) oxide and/or Cu(II) oxide.

11. Method according to claim 1, wherein the content of ammonia in the atmosphere is between 1 and 5000 vol ppm.

12. Method according to claim 1, wherein oxygen is contained in the atmosphere in amount of 10 vol % or lower.

13. Method according to claim 1, wherein the gaseous atmosphere contains 5 vol % water or less.

14. A metal exchanged microporous metalloaluminophosphate material or mixtures of metal exchanged microporous metalloaluminophosphate materials obtained by a method according to claim 1.

15. A method for the removal of nitrogen oxides from exhaust gas by selective catalytic reduction with a reductant, comprising contacting the exhaust gas with a catalyst comprising a metal exchanged crystalline microporous metalloaluminophosphate material or mixtures of metal exchanged crystalline microporous metalloaluminophosphate materials obtained by a method according to claim 1.

16. A method according to claim 15, wherein the reductant is ammonia or a precursor thereof.

17. A method according to claim 15, wherein the reductant comprises hydrocarbons.

* * * * *